United States Patent
Brown et al.

(10) Patent No.: US 7,010,781 B1
(45) Date of Patent: Mar. 7, 2006

(54) METHODS AND APPARATUS FOR MANAGING DEBUGGING I/O

(75) Inventors: Jordan Brown, Granada Hills, CA (US); Lisa M. Camesano, Newton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/504,156

(22) Filed: Feb. 15, 2000

(51) Int. Cl.
*G06F 9/44* (2006.01)

(52) U.S. Cl. .................... 717/124; 714/38; 717/133
(58) Field of Classification Search ........ 717/108–178; 714/38; 709/201–225
See application file for complete search history.

(56) References Cited

U.S. PATENT DOCUMENTS

| | | | |
|---|---|---|---|
| 5,155,847 A * | 10/1992 | Kirouac et al. ............. 709/221 |
| 5,321,840 A * | 6/1994 | Ahlin et al. ................. 717/178 |
| 5,615,331 A * | 3/1997 | Toorians et al. ................ 714/9 |
| 5,671,416 A * | 9/1997 | Elson .......................... 717/106 |
| 5,675,803 A * | 10/1997 | Preisler et al. .............. 717/131 |
| 5,784,552 A * | 7/1998 | Bishop et al. ................. 714/38 |
| 5,793,980 A * | 8/1998 | Glaser et al. ................ 709/231 |
| 5,953,530 A * | 9/1999 | Rishi .......................... 717/127 |
| 6,011,920 A * | 1/2000 | Edwards et al. ............ 717/130 |
| 6,035,426 A * | 3/2000 | Applegate ..................... 714/54 |
| 6,282,711 B1 * | 8/2001 | Halpern et al. ............. 717/175 |
| 6,434,681 B1 * | 8/2002 | Armangau .................... 711/162 |

* cited by examiner

*Primary Examiner*—Wei Y. Zhen
*Assistant Examiner*—Chuck Kendall
(74) *Attorney, Agent, or Firm*—Beyer Weaver & Thomas LLP (57) ABSTRACT

Methods and apparatus for providing replacement functions for a set of system services include requesting a primitive function from one of the set of system services, the primitive function replicating the one of the set of system services with reduced functionality. A reference to the requested primitive function is then sent from the one of the set of system services.

59 Claims, 5 Drawing Sheets

METHODS AND APPARATUS FOR MANAGING DEBUGGING I/O

BACKGROUND OF THE INVENTION

1. Field of the Invention

The present invention relates generally to computer software. More particularly, the present invention relates to methods and apparatus for providing a mechanism for managing input and output.

2. Description of the Related Art

The ability to debug a system is important during the development of the system as well as to ensure proper maintenance of the system upon completion of system development. In order to facilitate the debugging process, a variety of debugging tools are available. Typically, a debugging tool is loaded prior to testing or prior to running a system. When a system error occurs, the software developer or engineer may then access the debugging tool to identify and correct the error.

All system components may require debugging at various instances in time. For instance, even services provided by the kernel, the essential center of a computer operating system that provides basic services for all other parts of the operating system, may require debugging due to system errors. Typically, a kernel includes an interrupt handler that handles all requests or completed I/O operations that compete for the kernel's services, a scheduler that determines which programs share the kernel's processing time in what order, and a supervisor that actually gives use of the computer to each process when it is scheduled. A kernel may also include a manager of the operating system's address spaces in memory or storage, sharing these among all components and other users of the kernel's services.

It is particularly important that the functionality of both input and output services be preserved during the debugging of any system such as the operating system kernel. As one example, it is often desirable to write the contents of memory to a file for subsequent analysis. As another example, it is imperative that the ability to perform keyboard input be fully preserved in order to enter debugging commands.

Although I/O services are required to debug a system successfully, when an error occurs in a system such as the kernel, it is likely that the I/O operations handled by the kernel are also non-functional. In view of the above, it would therefore be desirable if a debugging tool independent of the system being debugged were developed. Moreover, it would be beneficial if a mechanism for ensuring I/O functionality during the debugging process could be provided.

SUMMARY

The present invention provides a secondary mechanism for performing a system function such as I/O functionality. This is accomplished through a set of primitive functions corresponding to a set of system services. The primitive functions, although "equivalent" to the set of system services, are reduced in functionality as well as performance. In this manner, a secondary mechanism for performing the set of system services is made available in the event of a system error.

In accordance with one aspect of the invention, the set of system services are in the form of a "stack" in which each layer relies on the functions provided by the layers below it. A primitive function request may be sent down to lower layers by layers above them in order to request an "equivalent" primitive function. The primitive function may, for instance, use polling rather than interrupts. In this manner, the primitive functions eliminate or reduce reliance on system functions which may be non-functional in the event of an error.

In accordance with another aspect of the invention, a receiving layer of a primitive function request may return identifying information associated with a primitive function for that layer. The upper layer receiving this identifying information may then store this information for later use. Thus, the upper layer has access to information that enables it to communicate with lower layers in the event of a system error. More particularly, the upper layer may communicate with one or more identified primitive functions associated with one or more lower layers of the stack.

Through the sending of primitive function requests and the sending of responses to those primitive function requests, a parallel stack of primitive mechanisms to the system services stack may be created. The stack of primitive mechanisms may be created for a variety of functions including, but not limited to, I/O and debugging functions. The appropriate primitive functions may then be called by one or more upper layers in the event of an error that would otherwise interfere with the "replaced" functions.

BRIEF DESCRIPTION OF THE DRAWINGS

The invention, together with further advantages thereof, may best be understood by reference to the following description taken in conjunction with the following figures.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
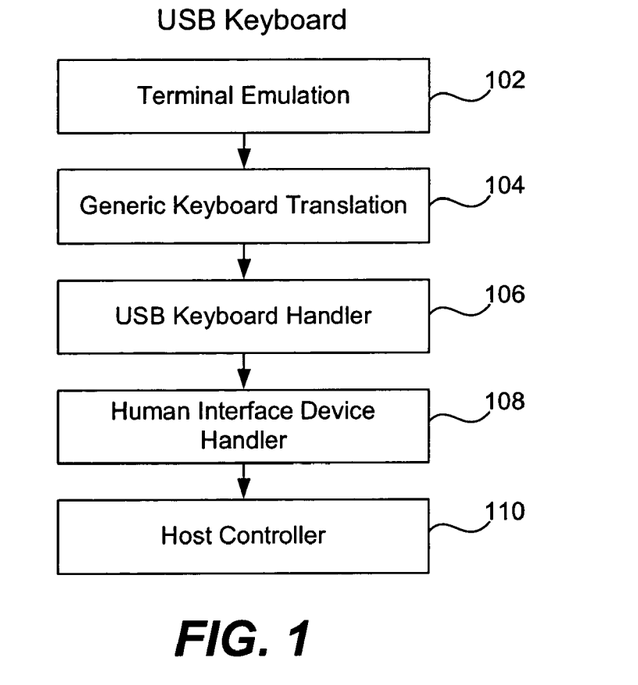
FIG. 1 is block diagram illustrating an exemplary stack of services supporting a USB keyboard.

It is particularly important in the debugging process that keyboard input be capable of being accepted as well as correctly interpreted. Software services supporting a functioning keyboard are often implemented in the form of a stack. Upper layers in the stack are supported by functions provided in lower layers of the stack. FIG. 1 is block diagram illustrating an exemplary stack of services supporting a USB keyboard. As shown, a top level 102 performs terminal emulation so that the keyboard and display form a unit. Generic keyboard translation 104 provides generic functionality so that various keys (e.g., the letter "A") may be recognized when pressed. A USB keyboard handler 106 translates keyboard input from the USB human interface device protocol to generic button press release events (e.g., third button on the keyboard) independent of the underlying hardware. In addition, a human interface device handler 108 and a host controller 110 form the remaining layers of the stack. More particularly, the human interface device handler 108 and the host controller 110 interact with information in the form of bits.

Figure 2:
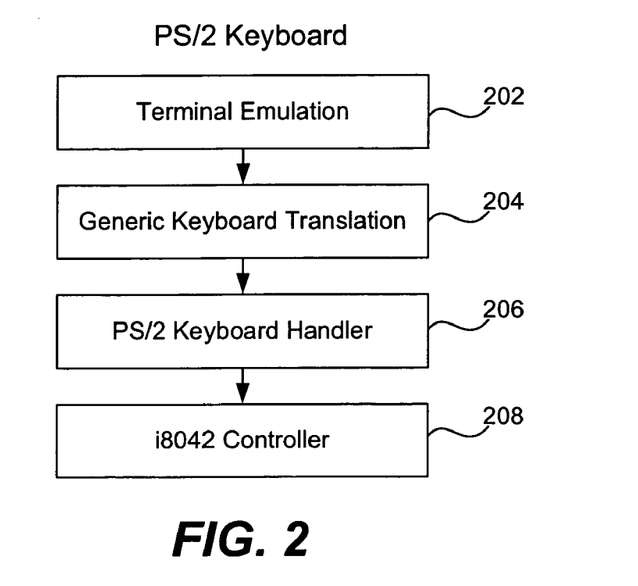
FIG. 2 is a block diagram illustrating an exemplary stack of services supporting a PS/2 keyboard.

Similarly, FIG. 2 is a block diagram illustrating an exemplary stack of services supporting a PS/2 keyboard. As shown, the top level 202 performs terminal emulation and the second level 204 performs generic keyboard translation, as described above with reference to FIG. 1. In addition, the remaining layers include a PS/2 keyboard handler 206 which translates hardware specific (i.e., PS/2) representations of button presses into generic representations of button presses and an i8042 controller 208 which controls the hardware that performs the data transfer. Although the previous examples are described with reference to a stack of services supporting a keyboard, the present invention is not limited to these examples and may be used with other devices and in other contexts.

As described above with reference to FIG. 1 and FIG. 2, services that provide I/O functionality such as those provided by a keyboard are often structured in the form of a stack. However, in the event of a system failure, one or more of the services in the stack may become inoperative. In fact, even one non-functional layer in the stack can prevent normal I/O functioning.

In accordance with one embodiment of the invention, a set of primitive functions corresponding to a set of system services is established. While the system services provide full-featured, high performance system services, the primitive functions are equivalents that need not be high performance or full-featured.

Figure 3A:
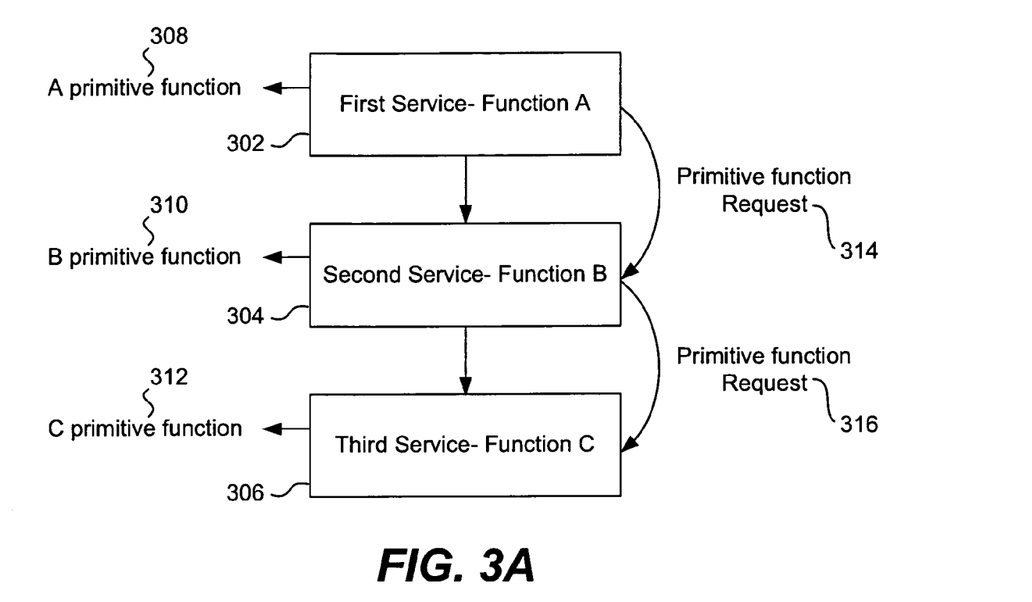
FIG. 3A is a block diagram illustrating one embodiment of the present invention.

The set of system services may be implemented by a set of software components to provide functionality for a variety of devices such as a keyboard. FIG. 3A is a block diagram illustrating one embodiment of the present invention. The set of services are shown here in the form of a "stack." Here, the services include a set of functions. More particularly, a first layer/service 302 (function A), a second layer/service 304 (function B), and a third layer/service 306 (function C) are illustrated. In addition, a set of primitive functions is associated with the set of services. As shown, the first service 302 has an associated primitive function 308 (A primitive function), the second service 304 has an associated primitive function 310 (B primitive function), and the third service 306 has an associated primitive function 312 (C primitive function). More particularly, each of the services 302, 304, and 306 may have a reference variable or pointer that identifies the associated primitive function.

In the event of a system failure, the system software and hardware may be unreliable. Thus, the set of primitive functions 308, 310, and 312 replicates the set of services 302, 304, and 306 with reduced functionality and performance without relying on this unreliable software and hardware. As one example, the set of primitive functions does not include interrupts. Rather, the set of primitive functions uses polling. For instance, characters may be provided to a serial line using polling rather than waiting until the information is requested by hardware through the use of an interrupt. Thus, the primitive function may continually check if the serial line is ready for another character. As another example, the set of primitive functions does not include timers. Instead, the set of primitive functions includes delay loops. For instance, a timer is typically used by a system service to request that it be called at a particular time. Since the system service may be unreliable in the event of an error, a delay loop may be used by an associated primitive function to continually check if this particular time has been reached.

In accordance with one embodiment, a primitive function request mechanism is adapted for returning one or more identifiers (e.g., reference variables or pointers) associated with one or more of the set of primitive functions. More particularly, the identifiers associated with the one or more of the set of primitive functions are returned in response to a primitive function request. A primitive function request may be sent down to any one of the layers in the stack. As one example, a first primitive function request 314 is sent from the first service 302 to the second service 304. Similarly, a second primitive function request 316 is sent from the second service 304 to the third service 306. In other words, the primitive function request is "propagated" down the one or more layers of the stack of system services.

Figure 3B:
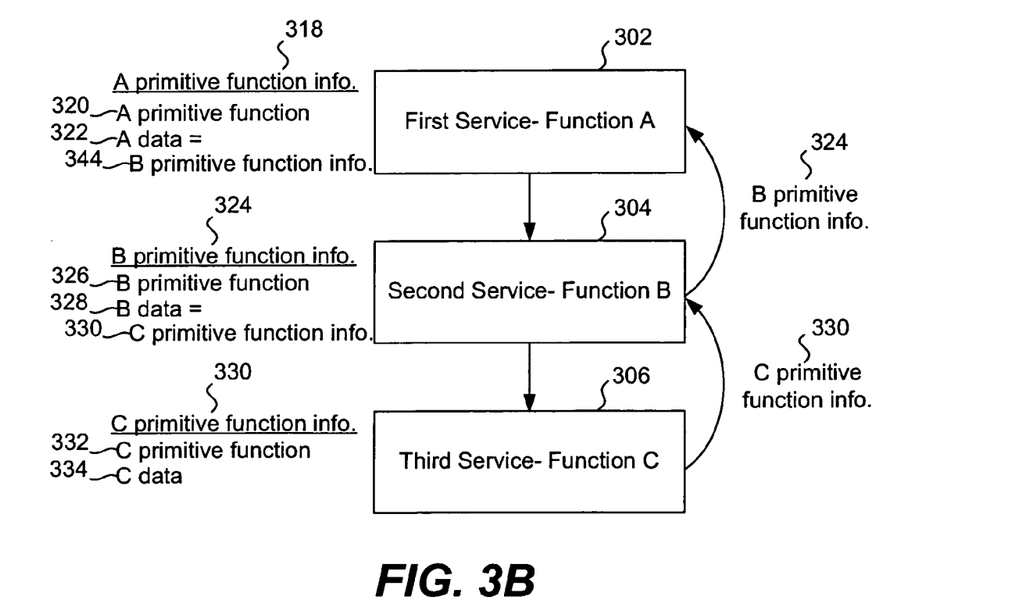
FIG. 3B is an exemplary block diagram illustrating the use of a primitive function request to gather primitive function information associated with one or more layers of a system services stack in accordance with one embodiment of the invention.

In response to a primitive function request, an identifier of one or more primitive functions is returned by the receiver (e.g., layer or service) of the primitive function request. FIG. 3B is an exemplary block diagram illustrating the use of a primitive function request to gather primitive function information associated with one or more layers of a system services stack in accordance with one embodiment of the invention. The primitive function information may include an identifier (e.g., reference or pointer) of the associated primitive function. The primitive function information may also include state information data to be provided to the primitive function when the primitive function is called. Moreover, the state information may include data that enables the corresponding service to communicate with another one of the set of services. More particularly, the state information may include data that enables the corresponding primitive function to identify another one of the set of primitive functions with which to communicate.

As shown in FIG. 3B, first primitive function information 318 associated with the first service 302 identifies a first primitive function 320 and first state information data 322. As described above, the state information data may enable the primitive function to identify another primitive function with which to communicate. Thus, the state information data 322 may further include or identify at least a portion of second primitive function information 324 associated with the second service 304. The second primitive function information 324 similarly identifies a second primitive function 326 and second state information data 328 where this state information data further identifies or includes at least a portion of third primitive function information 330 associated with the third service 306. The third primitive function information 330 identifies a third primitive function 332 as well as third state information data 334. Since the third service 306 is shown to be the bottom layer in the stack, the third state information data 334 does not include primitive function information for any other layer in the stack. The primitive function information shown and described is illustrative only, and therefore alternative embodiments are possible.

In response to a primitive function request, primitive function information associated with the primitive function is returned to the requesting layer or service. As shown, the second primitive function information 324 is returned to the first service 302. Similarly, the third primitive function information 330 is returned to the second service 304. The primitive function information may then be stored as shown to enable the requesting layer in the stack to communicate with the lower layer in the stack. These primitive functions associated with the returned primitive function information are ultimately meant to replace the associated services when the set of services (e.g., one or more of the services) are determined to be inoperative.

Figure 4:
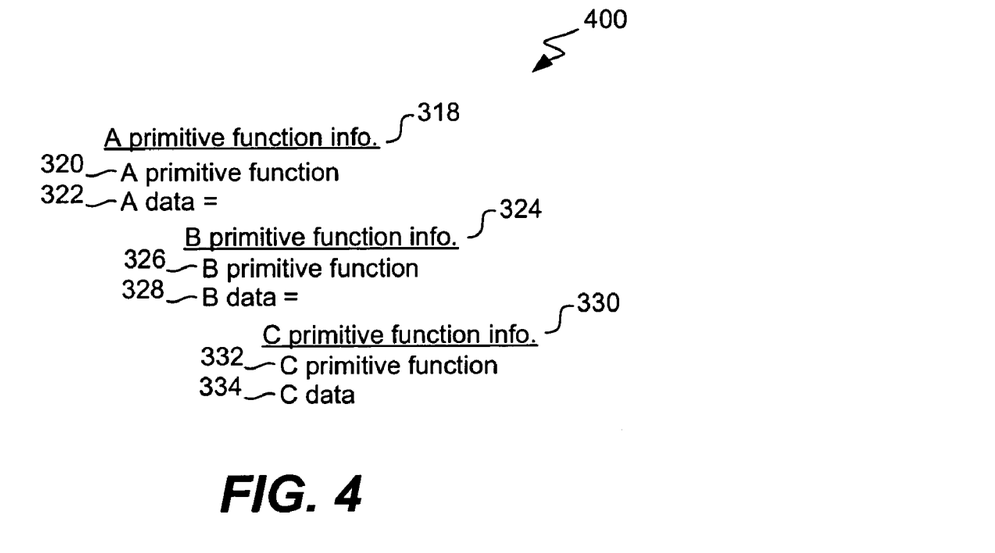
FIG. 4 is an exemplary diagram illustrating the result of sending primitive function requests and returning primitive function information.

FIG. 4 is an exemplary diagram illustrating the result of sending primitive function requests and returning primitive function information as discussed in conjunction with FIG. 3B. The sending of primitive function requests, returning of primitive function information, and storing of this primitive function information as state information data may be performed over multiple layers of a system services stack. This process may therefore be performed such that a stack of primitive mechanisms 400 parallel to the stack of system services is assembled, as shown.

Figure 5:
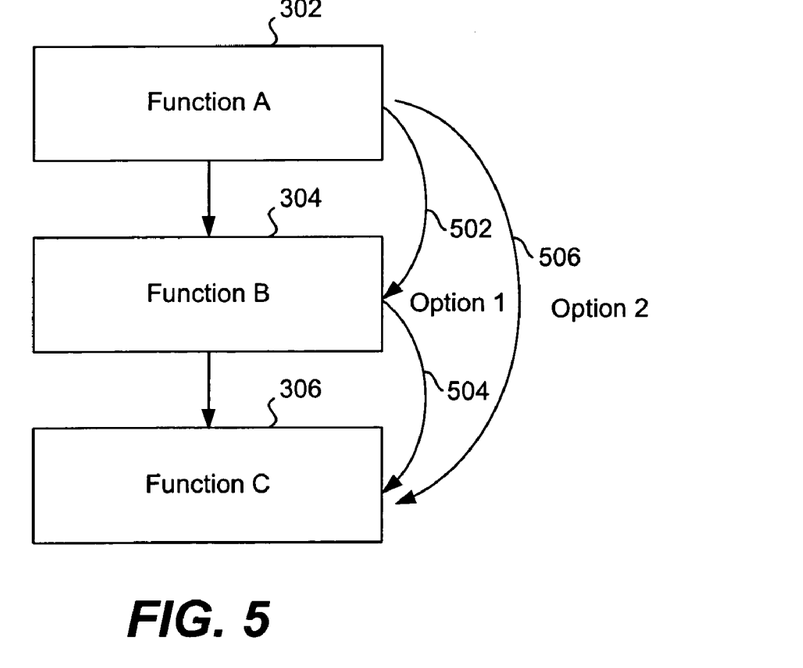
FIG. 5 is an exemplary block diagram illustrating potential ways in which primitive functions may be called.

Once a stack of primitive mechanisms such as that illustrated in FIG. 4 is created, the primitive functions may be called using the information effectively stored in the stack. FIG. 5 is an exemplary block diagram illustrating potential ways in which primitive functions may be called. A primitive function calling mechanism may be provided for calling one or more primitive functions associated with the one or more identifiers returned by the primitive function request mechanism. The primitive function calling mechanism may be associated with one or more of the set of components. Thus, multiple levels of the primitive function stack may call primitive functions associated with lower levels in the stack. For instance, as shown at line 502, the first level 302 is shown calling the primitive function associated with the second level 304. Similarly, the second level 304 is shown calling the primitive function associated with the third level 306, as shown at line 504. Thus, in this example, the first level 302 (associated with function A) must call the primitive function associated with the second level 304 (associated with function B) in order to enable the second level 304 of the stack to call the primitive function associated with the third level 306 (associated with function C). Alternatively, a single level (e.g., top level) of the stack of primitive mechanisms may call one or more primitive functions as shown at line 506. For instance, as shown at line 506, the first level of the primitive function stack (e.g., associated with function A 302) may call the primitive function associated with function C 306.

Figure 6:
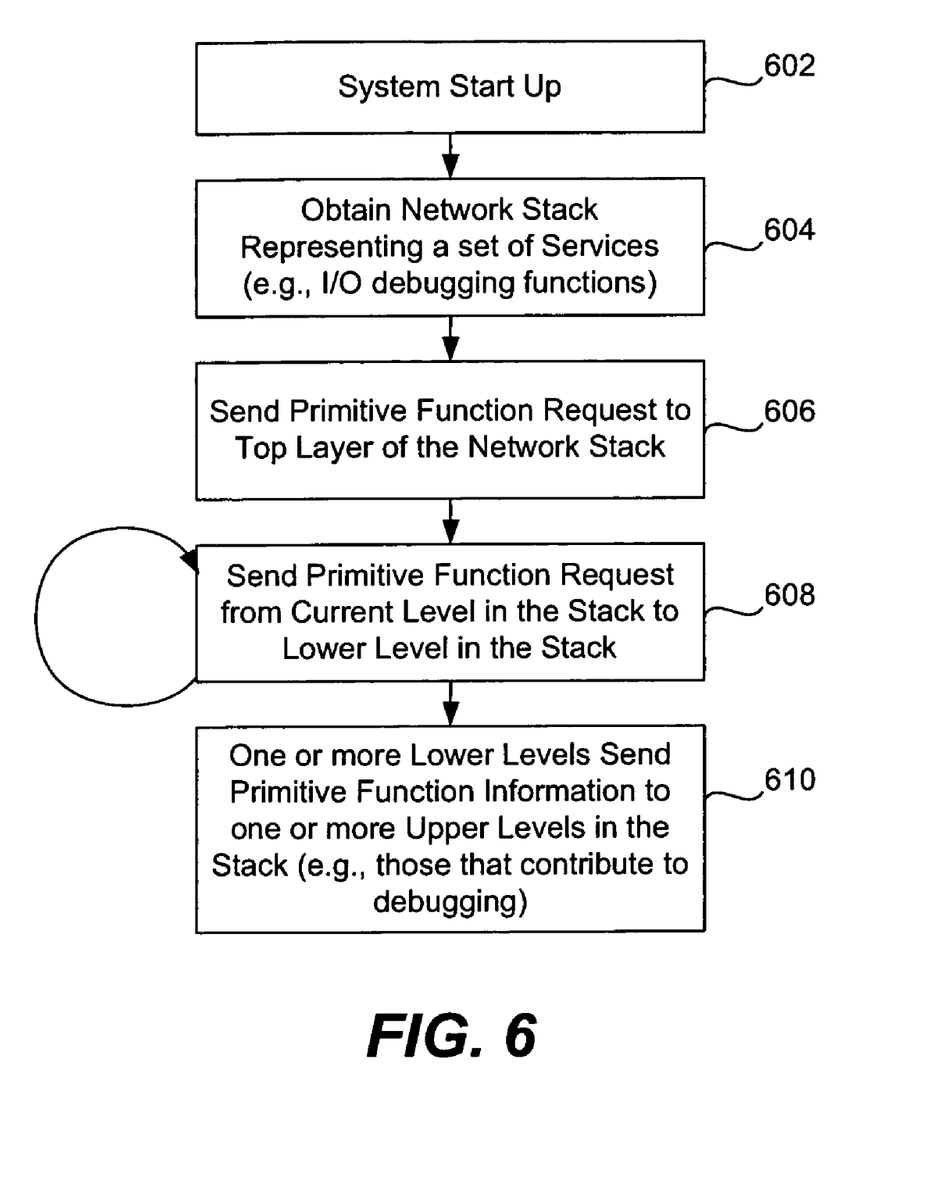
FIG. 6 is a process flow diagram illustrating one method of supplying an alternative primitive means for performing a system function.

The present invention may be implemented in a variety of ways. FIG. 6 is a process flow diagram illustrating one method of supplying an alternative primitive means for performing a system function. As shown, at block 602 there is a system start up and a stack such as that illustrated in FIG. 4 representing a set of services is obtained at block 604. A primitive function request is sent to one of the layers of the stack (e.g., the top layer of the stack) at block 606. More particularly, the primitive function request requests a primitive function from one of the set of system services. Moreover, the same or another primitive function request may be sent from the current level in the stack to a lower level in the stack as shown at block 608. This may be performed recursively, as shown. Upon receipt of the primitive function requests, the requested primitive function information is sent from one or more lower levels in the stack to one or more upper levels in the stack at block 610. Thus, although blocks 606 through 610 are shown consecutively, these functions may actually be performed in parallel since multiple requests may simultaneously be received and responded to by multiple levels in the stack.

In accordance with one embodiment of the invention, the set of services and the set of associated primitive functions provide functions for debugging. In addition, the set of services and the set of primitive functions provide input and output functionality. For instance, the set of services and the set of primitive functions may provide keyboard functionality to enable debugging in the event of a system (e.g., kernel) malfunction. Thus, a primitive function identifier associated with a requested primitive function may be sent only when the associated system service performs a debugging function or, alternatively, an input and/or output function. It follows that only in these instances is the primitive function identifier stored. In this embodiment, when a layer is responsible for performing input, output, and/or debugging functions, it sends a primitive function request to a lower layer in the stack so that the primitive means for performing an equivalent function may be established.

Figure 7:
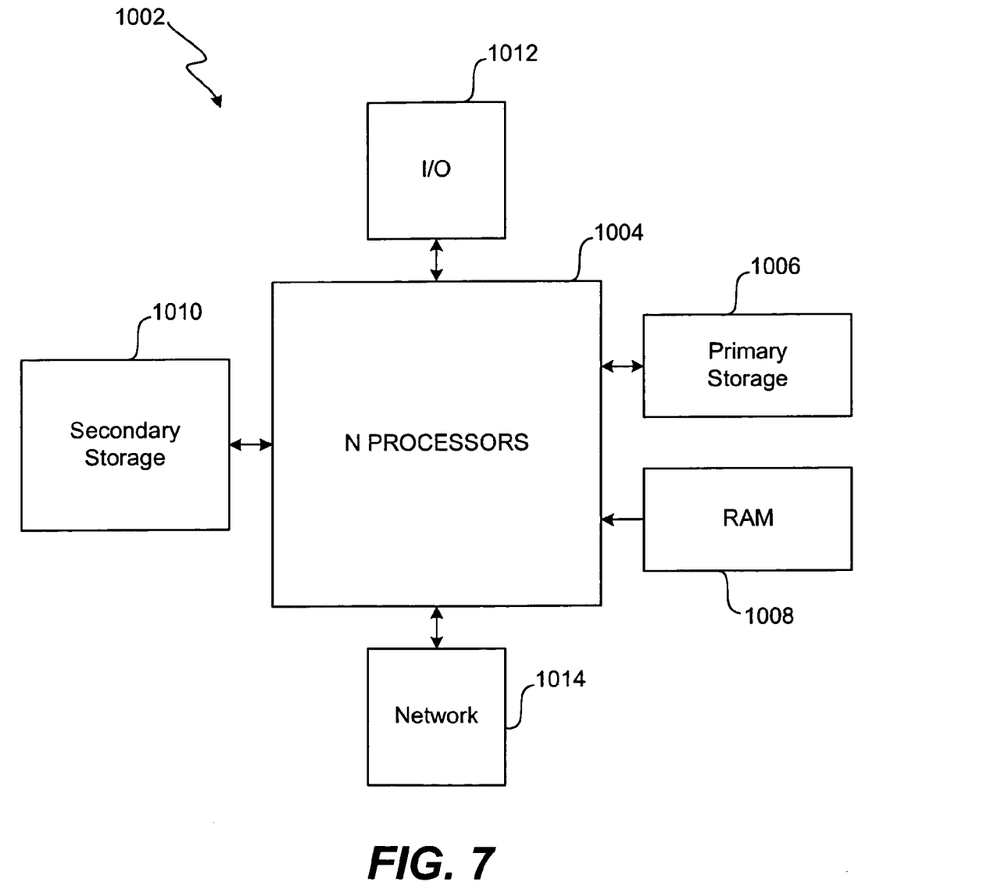
FIG. 7 is a block diagram illustrating a typical, general-purpose computer system suitable for implementing the present invention.

The present invention may be implemented on any suitable computer system. FIG. 7 illustrates a typical, general-purpose computer system 1002 suitable for implementing the present invention. The computer system may take any suitable form. For example, the computer system may be integrated with a digital television receiver or set top box.

Computer system 1030 or, more specifically, CPUs 1032, may be arranged to support a virtual machine, as will be appreciated by those skilled in the art. The computer system 1002 includes any number of processors 1004 (also referred to as central processing units, or CPUs) that may be coupled to memory devices including primary storage device 1006 (typically a read only memory, or ROM) and primary storage device 1008 (typically a random access memory, or RAM). As is well known in the art, ROM acts to transfer data and instructions uni-directionally to the CPUs 1004, while RAM is used typically to transfer data and instructions in a bi-directional manner. Both the primary storage devices 1006, 1008 may include any suitable computer-readable media. The CPUs 1004 may generally include any number of processors.

A secondary storage medium 1010, which is typically a mass memory device, may also be coupled bi-directionally to CPUs 1004 and provides additional data storage capacity. The mass memory device 1010 is a computer-readable medium that may be used to store programs including computer code, data, and the like. Typically, the mass memory device 1010 is a storage medium such as a hard disk which is generally slower than primary storage devices 1006, 1008.

The CPUs 1004 may also be coupled to one or more input/output devices 1012 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1004 optionally may be coupled to a computer or telecommunications network, e.g., an internet network or an intranet network, using a network connection as shown generally at 1014. With such a network connection, it is contemplated that the CPUs 1004 might receive information from the network, or might output information to the network in the course of performing the above-described method steps. Such information, which is often represented as a sequence of instructions to be executed using the CPUs 1004, may be received from and outputted to the network, for example, in the form of a computer data signal embodied in a carrier wave.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being applicable to systems in which I/O functionality and therefore debugging functionality is provided through the use of primitive functions. However, primitive functions may be used to provide equivalent functionality in a variety of systems and for a variety of purposes. Moreover, the above-described process blocks are illustrative only. Therefore, it should be understood that primitive function requests and associated return information may be simultaneously sent and received by multiple levels of the stack. Moreover, although the present invention is described as being implemented at system startup to create a parallel stack of primitive mechanisms, the stack of primitive mechanisms may be provided statically as well as created after system startup. Accordingly, the present embodiments are to be considered as illustrative and not restrictive, and the invention is not to be limited to the details given herein, but may be modified within the scope and equivalents of the appended claims.

What is claimed is:

1. In a computer system providing a set of software system services, a method of providing replacement functions for a stack of software system services, the stack of software system services including one or more layers, each layer representing one of the software system services, wherein lower layers provide services to upper layers in the stack, comprising:

automatically sending a request for a primitive function down from one of the layers of the stack of software system services to another one of the layers in the stack of system services, the primitive function replicating the another one of the set of software system services receiving the request for the primitive function in a manner such that implementation of the primitive function reduces or eliminates reliance on one or more system functions capable of becoming non-functional in the event of a system error; and receiving an identifier associated with the requested primitive function at the one of the set of software system services sending the request for the primitive function from another one of the set of software system services in response to the request, thereby enabling the one of the set of software system services to call the primitive function via the identifier associated with the requested primitive function instead of the another one of the set of software system services.

2. The method as recited in claim 1, wherein receiving the identifier associated with the requested primitive function is performed only when the another one of the set of software system services receiving the request for the primitive function performs a debugging function.

3. The method as recited in claim 1, wherein receiving the identifier associated with the requested primitive function is performed only when the another one of the set of software system services receiving the request for the primitive function performs at least one of an input and an output function.

4. The method as recited in claim 1, wherein the set of software system services provide keyboard functionality.

5. The method as recited in claim 1, wherein the set of software system services provide debugging functions.

6. The method as recited in claim 1, wherein the set of software system services provides at least one of an input and an output function.

7. The method as recited in claim 1, wherein the set of software system services provides input and output functionality.

8. The method as recited in claim 1, wherein the primitive function uses polling.

9. The method as recited in claim 1, wherein the primitive function does not include interrupts.

10. The method as recited in claim 1, wherein the primitive function includes delay loops.

11. The method as recited in claim 1, wherein the primitive function does not include timers.

12. The method as recited in claim 1, wherein sending a request for a primitive function and receiving the identifier associated with the requested primitive function is performed when the one of the set of software system services provides I/O functionality.

13. The method as recited in claim 1, wherein the set of software system services are provided by an operating system of the computer system.

14. The method as recited in claim 1, wherein the set of software system services are provided by an operating system kernel of the computer system.

15. The method as recited in claim 1, further comprising:
   executing a debugger that calls one or more of the set of system services.

16. A method of providing replacement functions for a stack of software system services, the stack of software system services including one or more layers, each layer representing one of the software system services, wherein lower layers provide services to upper layers in the stack, the method comprising:

automatically sending a primitive function request for a primitive function down from one of the layers of the stack of software system services to another one of the layers in the stack of software system services, the primitive function replicating the system service associated with the another one of the layers in the stack receiving the primitive function request;

when the another one of the layers receiving the primitive function request is responsible for performing at least one of input and output, returning a primitive function identifier associated with the primitive function to the one of the layers of the stack of software system services sending the primitive function request in response to the primitive function request.

17. The method as recited in claim 16, further comprising:
   propagating the primitive function request down the one or more layers of the stack of software system services.

18. The method as recited in claim 16, wherein the stack of software system services are provided by an operating system.

19. The method as recited in claim 16, further comprising:
   executing a debugger that calls one or more layers of the stack of software system services.

20. A method of providing replacement functions for a stack of software system services, the stack of software system services including one or more layers, each layer representing one of the software system services, wherein lower layers provide services to upper layers in the stack, the method comprising:

automatically sending a primitive function request for a primitive function down from one of the layers of the stack of software system services to another one of the layers in the stack of software system services, the primitive function replicating the system service associated with the another one of the layers in the stack receiving the primitive function request;

when the another one of the layers receiving the primitive function request is responsible for performing at least one of input and output, returning a primitive function identifier associated with the primitive function to the one of the layers of the stack of software system services sending the primitive function request in response to the primitive function request; and when the another one of the layers is responsible for performing at least one of input and output, automatically sending another primitive function request from the another one of the layers in the stack of software system services that previously received the primitive function request from the one of layers of the stack of system services sending the primitive function request to a lower layer in the stack of software system services.

21. In a computer system, a method of providing replacement functions for a stack of software system services, the stack of system services including one or more layers, each layer representing one of the software system services, wherein lower layers provide services to upper layers in the stack, the method comprising:

automatically sending a primitive function request for a primitive function down from a first one of the layers in the stack of software system services to a second one of the layers in the stack of software system services, the primitive function replicating the system service associated with the second one of the layers in the stack of software system services in a manner such that implementation of the primitive function reduces or eliminates reliance on one or more system functions capable of becoming non-functional in the event of a system error;

returning primitive function information associated with the primitive function to the first one of the layers sending the primitive function request; and storing the primitive function information to enable the first one of the layers in the stack of system services sending the primitive function request to communicate with the primitive function associated with the second one of the layers in the stack of software system services.

22. The method as recited in claim 21, wherein the primitive function information includes a pointer to the primitive function.

23. The method as recited in claim 21, wherein the primitive function information includes state information data to be provided to the primitive function when the primitive function is called.

24. The method as recited in claim 21, wherein the returning and storing steps are performed when the second one of the layers in the stack contributes to at least one of input and output.

25. The method as recited in claim 21, wherein the returning and storing steps are performed when the second one of the layers in the stack contributes to debugging functions.

26. The method as recited in claim 21, wherein the stack of software system services provide keyboard functionality.

27. The method as recited in claim 21, wherein the stack of software system services provide debugging functions.

28. The method as recited in claim 21, wherein the stack of software system services provides at least one of an input and an output function.

29. The method as recited in claim 21, wherein the stack of software system services provides input and output functionality.

30. The method as recited in claim 21, wherein the primitive function uses polling.

31. The method as recited in claim 21, wherein the primitive function does not include interrupts.

32. The method as recited in claim 21, wherein the primitive function includes delay loops.

33. The method as recited in claim 21, wherein the primitive function does not include timers.

34. The method as recited in claim 21, wherein sending a primitive function request for a primitive function is performed when the first one of the layers in the stack of software system services provides I/O functionality.

35. The method as recited in claim 21, wherein sending a primitive function request for a primitive function is performed only when the first one of the layers in the stack of software system services performs a debugging function.

36. The method as recited in claim 21, wherein sending a primitive function request for a primitive function is performed only when the first one of the layers in the stack of software system services performs at least one of an input and an output function.

37. The method as recited in claim 21, wherein the stack of software system services are provided by an operating system of the computer system.

38. In a computer system, a method of providing replacement functions for a stack of software system services, the stack of system services including one or more layers, each layer representing one of the software system services, wherein lower layers provide services to upper layers in the stack, the method comprising:

automatically sending a primitive function request for a primitive function down from a first one of the layers in the stack of software system services to a second one of the layers in the stack of software system services, the primitive function replicating the system service associated with the second one of the layers in the stack of software system services in a manner such that implementation of the primitive function reduces or eliminates reliance on one or more system functions capable of becoming non-functional in the event of a system error;

returning primitive function information associated with the primitive function to the first one of the layers sending the primitive function request;

storing the primitive function information to enable the first one of the layers in the stack of system services sending the primitive function request to communicate with the primitive function associated with the second one of the layers in the stack of software system services; and repeating the sending, returning, and storing steps over multiple layers of the stack such that a stack of primitive mechanisms parallel to the stack of software system services is assembled.

39. A system for providing replacement system functions for a stack of software system services, the stack of software system services including one or more layers, each layer representing one of the software system services, wherein lower layers provide services to upper layers in the stack, in a computer system, comprising:

a set of software components providing a set of services;

automatically sending a primitive function request for a set of primitive software functions down from one of the layers of the stack of software system services to another one of the layers in the stack of system services, the set of primitive software functions replicating the set of services, wherein each of the set of primitive software functions eliminates or reduces reliance on one or more system functions that are capable of becoming non-functional in the event of a system error; and a primitive function request mechanism adapted for being called by one of the set of software components providing the set of services and returning one or more identifiers associated with one or more of the set of primitive software functions to the one of the set of software components calling the primitive function request mechanism, thereby enabling the one of the set of software components calling the primitive function request mechanism to call the one or more of the set of primitive software functions via the returned one or more identifiers.

40. The system as recited in claim 39, further comprising:
a primitive function calling mechanism adapted for calling one or more primitive software functions associated with the one or more identifiers returned by the primitive function request mechanism.

41. The system as recited in claim 40, wherein the primitive function calling mechanism is associated with one or more of the set of software components.

42. The system as recited in claim 39, wherein the one or more of the set of primitive software functions replace one or more of the set of services when the set of services are determined to be inoperative.

43. The system as recited in claim 39, wherein the one or more identifiers associated with one or more of the set of primitive software functions are returned in response to a primitive function request.

44. The system as recited in claim 39, further comprising:
state information associated with each of the set of software components, the state information including data that enables the corresponding service to communicate with another one of the set of services.

45. The system as recited in claim 39, further comprising:
state information associated with each of the set of components, the state information including data that enables the corresponding primitive software function to identify another one of the set of primitive software functions with which to communicate.

46. The system as recited in claim 39, wherein the set of services and the set of primitive software functions provide input and output functionality.

47. The system as recited in claim 39, wherein the set of services and the set of primitive software functions provide keyboard functionality.

48. The system as recited in claim 39, wherein the primitive function request mechanism is adapted for returning one or more identifiers associated with one or more of the set of primitive functions to one of the set of software system services in response to a primitive request sent by the one of the set of software system services.

49. The system as recited in claim 39, wherein the set of services provide keyboard functionality.

50. The system as recited in claim 39, wherein the set of services provide debugging functions.

51. The system as recited in claim 39, wherein the set of services provides at least one of an input and an output function.

52. The system as recited in claim 39, wherein the set of services provides input and output functionality.

53. The system as recited in claim 39, wherein the set of primitive functions use polling.

54. The system as recited in claim 39, wherein the set of primitive functions do not include interrupts.

55. The system as recited in claim 39, wherein the set of primitive functions include delay loops.

56. The system as recited in claim 39, wherein the set of primitive functions do not include timers.

57. The method as recited in claim 39, further comprising:
executing a debugger that calls one or more layers of the stack of software system services.

58. A computer-readable medium for providing replacement functions for a stack of software system services, the stack of software system services including one or more layers, each layer representing one of the software system services, wherein lower layers provide services to upper layers in the stack in a computer system, the computer-readable medium storing instructions thereon, comprising:
instructions for automatically sending a request for a primitive function from one of the set of software system services to another one of the set of software system services, the primitive function replicating the another one of the set of software system services receiving the request for the primitive function in a manner such that implementation of the primitive function reduces or eliminates reliance on one or more system functions capable of becoming non-functional in the event of a system error; and
instructions for receiving an identifier associated with the requested primitive function at the one of the set of software system services sending the request for a primitive function from another one of the set of software system services in response to the request, thereby enabling the one of the set of software system services to call the primitive function via the identifier associated with the requested primitive function instead of the another one of the set of software system services.

59. An apparatus for providing replacement functions for a stack of software system services in a computer system, the stack of software system services including one or more layers, each layer representing one of the software system services, wherein lower layers provide services to upper layers in the stack, comprising:
means for automatically sending a primitive function request for a primitive function down from a first one of the layers in the stack of software system services to a second one of the layers in the stack of software system services, the primitive function replicating the system service associated with the second one of the layers in the stack of software system services in a manner such that implementation of the primitive function reduces or eliminates reliance on one or more system functions capable of becoming non-functional in the event of a system error;
means for returning primitive function information associated with the primitive function to the first one of the layers sending the primitive function request; and
means for storing the primitive function information to enable the first one of the layers in the stack of software system services sending the primitive function request to communicate with the primitive function associated with the second one of the layers in the stack of software system services.

* * * * *